March 25, 1930.  R. T. ROMINE  1,751,717
CAR LOADING AND UNLOADING METHOD
Filed Aug. 10, 1926   7 Sheets-Sheet 7
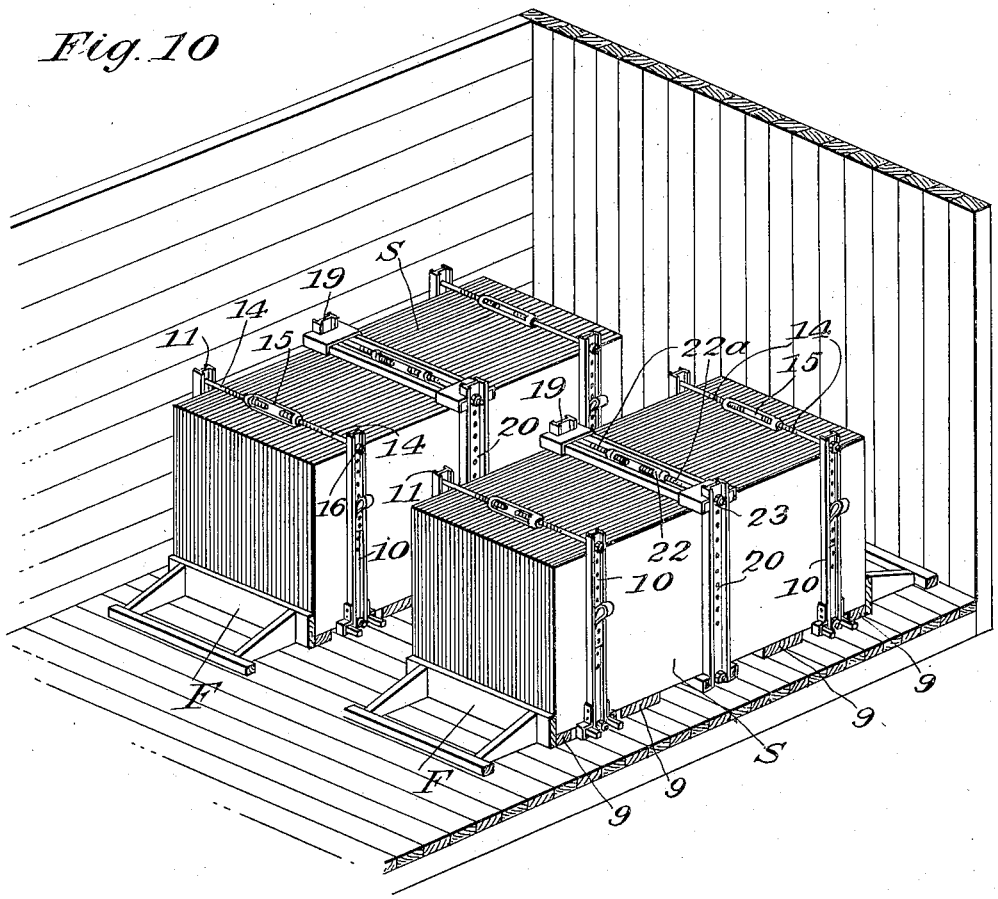
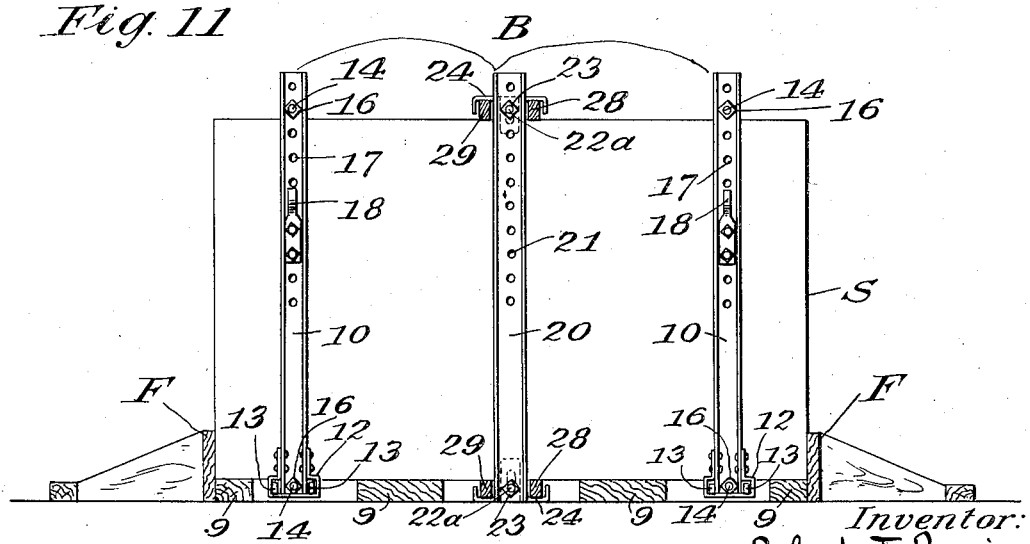
Inventor:
Robert T. Romine
By Macleod, Calver, Copeland + Dike
  Attorneys.

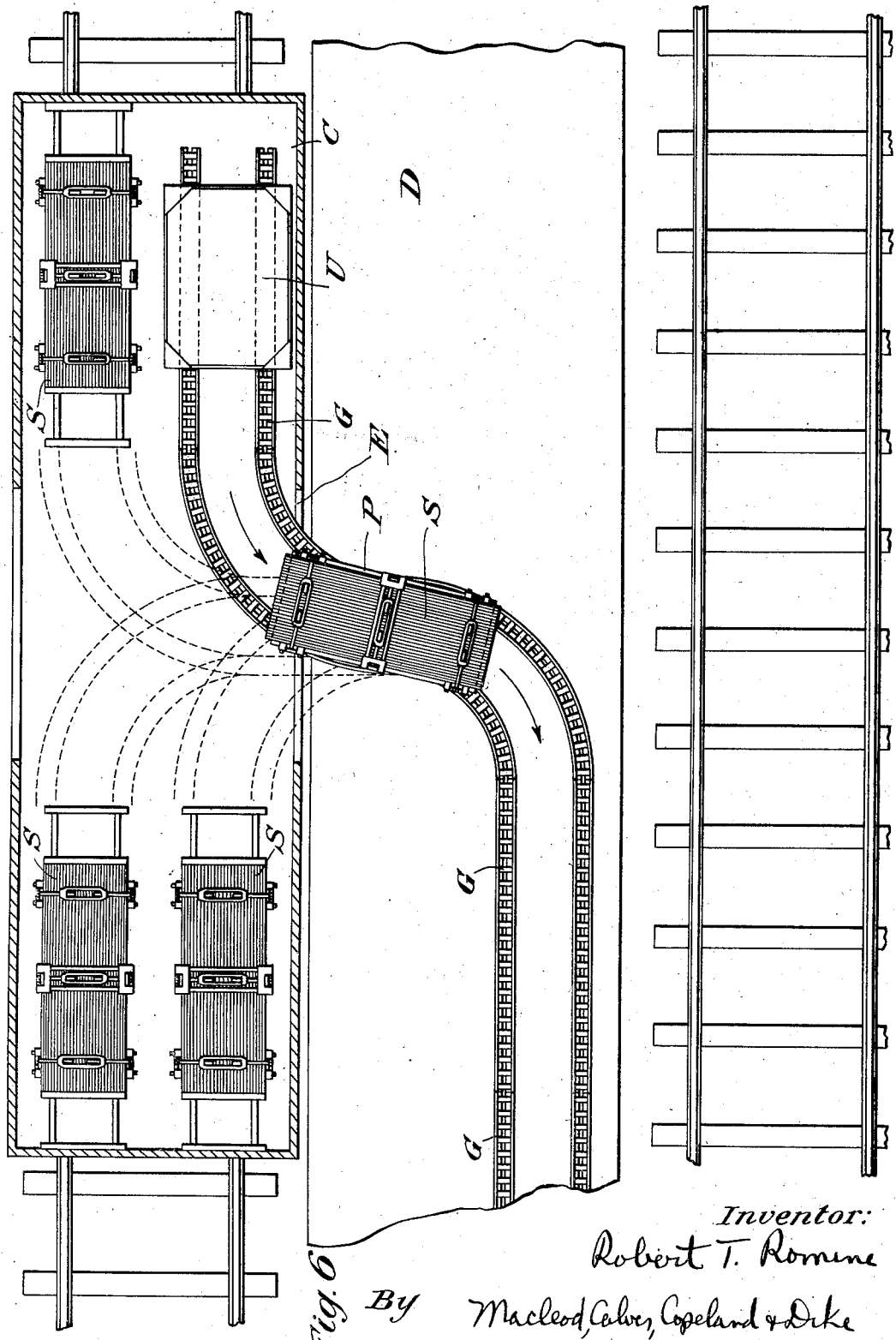

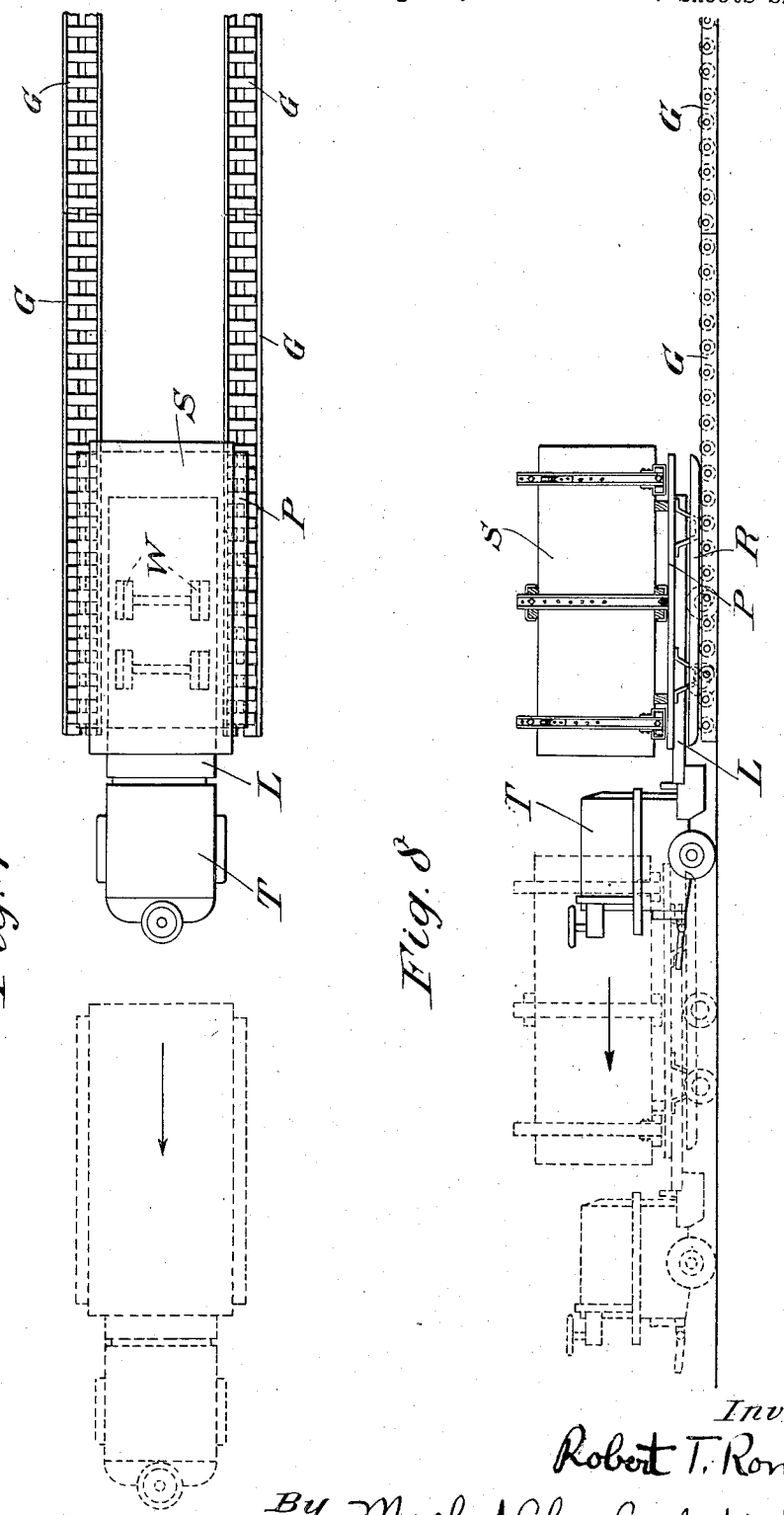

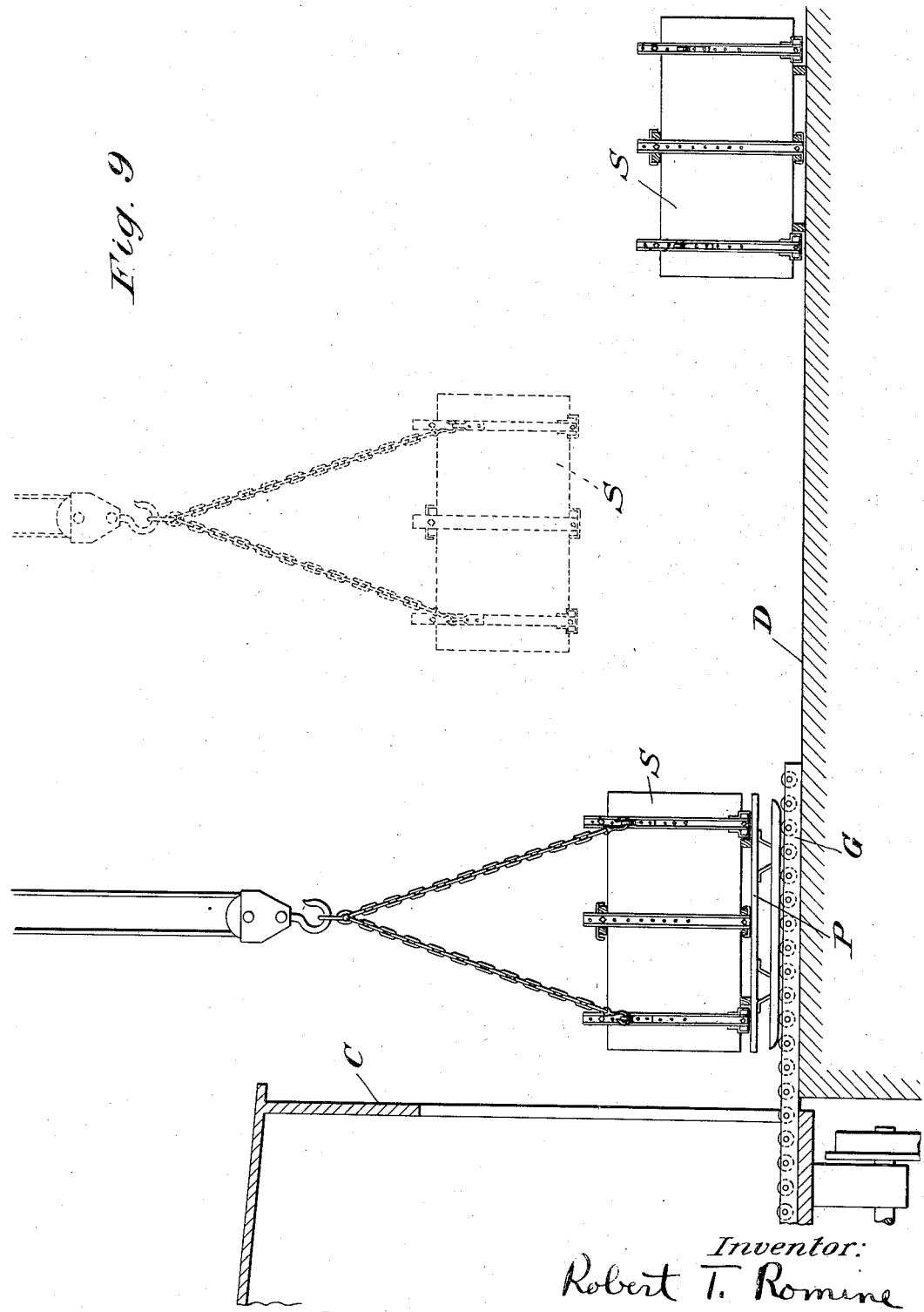

Patented Mar. 25, 1930

1,751,717

UNITED STATES PATENT OFFICE

ROBERT T. ROMINE, OF MOUNT CLEMENS, MICHIGAN

CAR LOADING AND UNLOADING METHOD

Application filed August 10, 1926. Serial No. 128,397.

This invention relates to the method of handling material, and also to means or apparatus adapted for enabling the method to be practiced or carried out in an efficient and practical manner, the invention particularly concerning a method for loading and unloading freight cars wherein the material to be loaded or unloaded is of such weight or character as to render it impracticable or impossible to handle by hand without breaking up the bundles, or packs and the separate manual handling of the constituent parts thereof. Heretofore material such as sheet steel, etc., has been loaded or unloaded by handling the separate sheets, hence requiring considerable time and involving great labor expense.

The present invention is especially adapted for use in connection with the handling, loading, transporting and unloading of metal, such as sheet metal and especially sheet steel, strip and bar steel or metal plates, or other heavy finished material of this character, in freight cars and one of the objects is to enable the metal to be packed or crated, and held in the car during transit so as to prevent shifting of the metal as a result of collisions or blows to which the cars are subjected and the consequent damage to the cars, and in addition to enable the metal to be loaded and unloaded, or carried into or out of the car in relatively large or heavy units or bundles without any manual handling of the separate parts of each unit or pack.

The invention therefore contemplates the provision of a method and apparatus whereby sheet metal, plates, or other heavy material which must be handled and shipped with care to prevent damage to it, may be carried or propelled into the car in units, such as packs or bundles approximating ten tons, deposited and braced in the car ready for shipment, and unloaded at the destination by carrying or conveying the bundle or unit directly out of the car to the place of storage or delivery at the factory or plant.

Other objects of this invention will appear in the following description and appended claims, reference being had to the accompanying drawings forming a part of this specification wherein like reference characters designate corresponding parts in the several views.

In said drawings:

Fig. 6 is a diagrammatic plan view showing the manner in which the bundles may be carried or rolled either out of or into the car.

Figs. 7 and 8 are plan and side views showing the manner in which the pack or bundle may be transferred to a lift truck.

Fig. 9 is a diagrammatic side view showing a manner in which the bundle or pack may be removed at the car doorway by means of a crane.

Fig. 10 is a fragmentary perspective view showing two bundles or racks of sheet metal loaded and braced in the car.

Fig. 11 is a side elevation illustrating one form of bracing apparatus for a pack or stack of sheet metal or material.

Before explaining in detail the present invention, and the method or mode or operation embodied therein, it is to be understood that the invention is not limited in its application to the details of constructon and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

Figure 1:
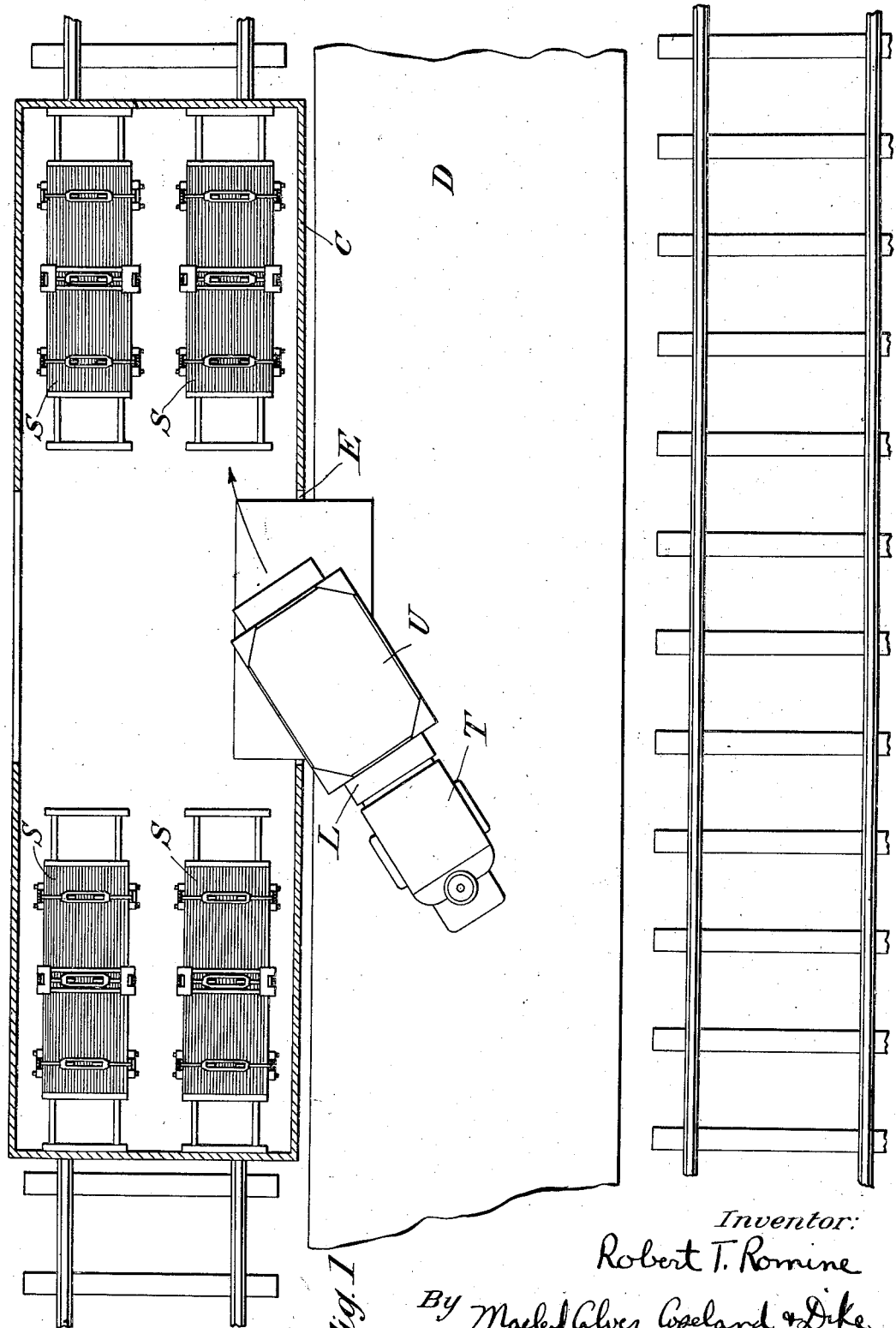
Fig. 1 is a diagrammatic plan view illustrating a freight car loaded in accordance with my method and in position to be unloaded at the loading dock.
Figure 2:
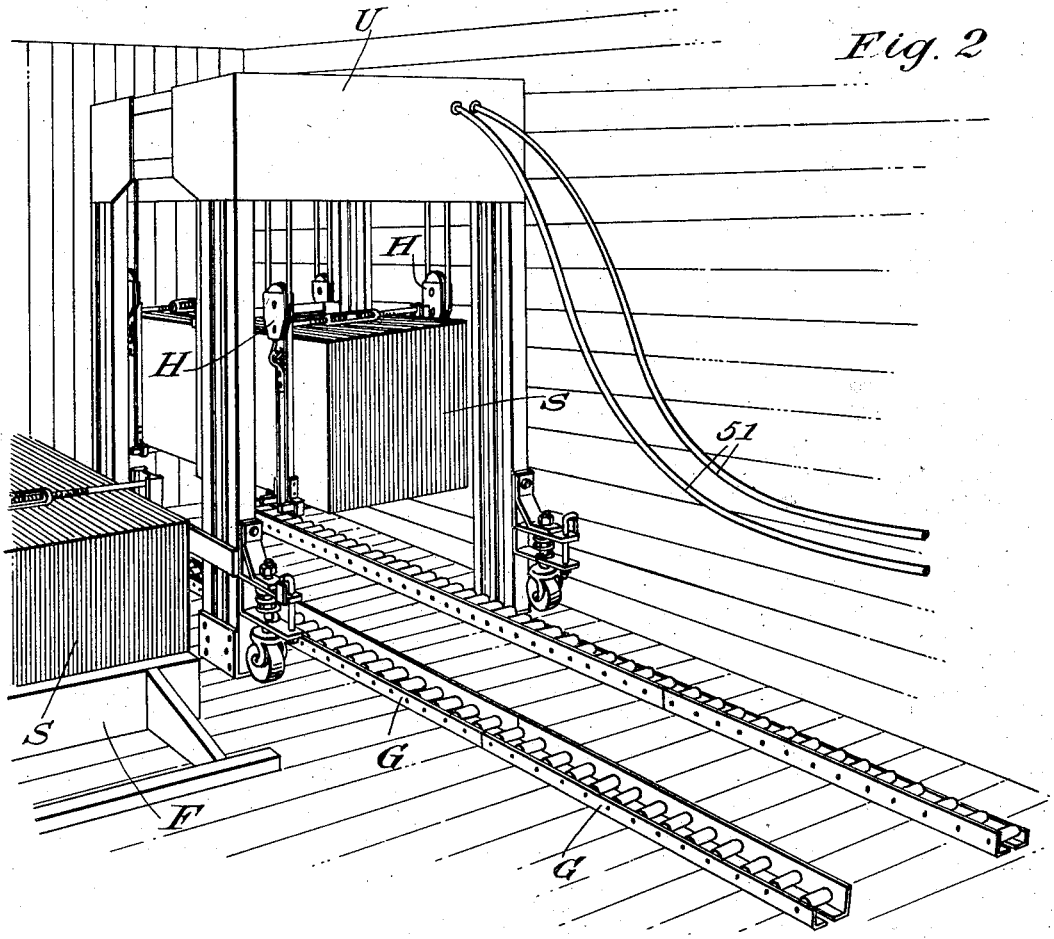
Fig. 2 is a perspective view illustrating a step in the method in which the bundle is raised above the car floor after being brought into the car or preparatory to being conveyed out of the car.

The present application is a continuation in part of my copending application Serial No. 109,124, filed May 14, 1926, patented January 25, 1927, No. 1,615,813. It will be understood that the invention may be adapted in accordance with the requirements or freight handling facilities of the particular manufacturing plant, and in Figs. 1 and 6 for the purposes of illustration the loading docks D are substantially on a level with the floor of the freight car C, the railroad tracks running along the opposite sides of the dock and being lowered or submerged. The freight cars are customarily limited to loads of approximately forty tons, and I prefer to place in the car, as shown in Fig. 1, four packs or stacks S, two at each end of the car with aisle spaces between the adjacent stacks and between each stack and the adjacent side wall of the car to permit the stack lifter U to be moved into position to straddle the stack, as shown in Fig. 2, to lift it bodily from the floor onto the platform or conveying medium, or when loading the car to lift it from the platform onto the car floor.

Each pack or bundle of material such as metal or steel sheets, is preferably braced or tied in a compact unit before it is carried into the car and a present form of this bracing apparatus is illustrated in Figs. 10 and 11, the sheets in this instance being supported on edge although it will be understood that the present method is equally adapted for application where it is desired to ship the sheets flatwise, or where bracing apparatus of different constructions are used, such as for strip or bar steel, or where the sheets are loaded flatwise.

When the pack or bundle of sheets is deposited on the car floor, a series of wooden sills or cross members 9 are preferably first placed in position on the floor of the car and preferably secured to the floor crosswise or transversely to the pack or sheets. The bundle S is placed in position on the wooden members 9 so that the entire weight of the sheets will be carried by these members, the sheets being positioned on edge in a vertical plane as clearly illustrated in Fig. 10. In this manner it will be seen that the longitudinal bottom edge of each sheet will engage the several wood sills 9, which are spaced apart sufficiently to provide guide spaces for the bracing or clamping devices B.

The bracing or clamping apparatus in the present instance preferably comprises identical sets of devices at opposite ends of the bundle, and in addition a device preferably located midway of the bundle. The end bracing devices each comprises a pair of vertical clamping and lifting bars 10 and 11 one at each vertical side face of the bundle and these bars being preferably in the form of I-beams. Riveted to the lower end of each bar 10 and 11 is a stirrup 12 which comprises a steel bar or strap riveted at the opposite ends thereof to opposite flanges of the I-bar and bent around the lower end of the bar in loop form to provide a pair of openings or pockets at opposite sides of the bar. Loosely fitting into these pockets and extending crosswise or transversely beneath the stack are a pair of steel bars 13. Each bar 10 and 11 at its lower end is drilled to receive the ends of a turnbuckle 15 which connects the bars 10 and 11 of each pair. The turnbuckle has oppositely extending rods 14 threaded at their ends to receive an adjusting nut 16, and by tightening these nuts the bars 10 and 11 may be drawn together at the lower ends thereof against the opposite sides of the bundle. The upper ends of the bars 10 and 11 are connected together by means of a second turnbuckle 15 having oppositely extending threaded rods 14 projecting through holes in the upper ends of the bars, and the bars may be adjusted toward and from the bundle by operating either the turnbuckle or the nuts 16 on the ends of the turnbuckle rods. Each bar 10 and 11 is provided with a vertical series of spaced holes 17, to permit the upper turnbuckle rods to extend through any of the holes to accommodate sheets of different widths or bundles of different heights. Adjustably secured to each bar 10 and 11 is a steel eye loop 18 by means of which the bundle as hereinafter described may be lifted. Each loop 18 comprises a steel bar or strap bent upon itself to provide an eye or loop to receive the hook of a hoisting sheave, and adjustably secured at different heights to the bar 10 or 11 by means of a pair of bolts and nuts connected through any of the holes 17 to the bars 10 or 11.

From this construction will be seen that the bars 10 and 11 of each set may be drawn together at the upper and lower ends thereof so as to squeeze or compress the pack transversely adjacent each end thereof. It will be noted that the wooden sills 9 support the pack on the car floor without permitting the sheets to rest upon or engage the steel bars 13. Upon hoisting the pack by means of the eye loops 18, the weight of the pack will be sustained by the bars 10, 11 and 13, connected together through the medium of the steel stirrups or loops 12. The lifting strain will be taken entirely by these elements, and none of the strain will be transmitted to the lower turnbuckle 15.

The bundle is also preferably clamped or braced intermediate the sets of bracing 10—11 by means of a pair of I-beams or bars 19 and 20 at opposite sides of the bundle. These bars are connected together at the top and bottom thereof by means of turnbuckles 22, having threaded rods 22ª extending through any of a series of vertically spaced holes 21 in each bar. It will be seen that the bars 19 and 20 may therefore be adjusted and clamped against the opposite faces of the sheets either by operating the turnbuckle or the adjusting nuts 23 on the outer ends of the turnbuckle rods.

A pair of wooden beams or bars 28 are preferably held against the upper and lower edges of the sheets, centrally thereof, and these bars are held in adjusted position by means of upper and lower clamp plates 24 having flanges 27 to retain the bars in position. The clamp plates 24 are connected to the bars 19 or 20 through the medium of the turnbuckle rods and form a cushion engaging the upper and lower parallel edges of the sheets to hold them against longitudinal movement. The foregoing construction is more particularly shown and described in my copending application and a further detailed description herein is not deemed necessary.

Each bundle, in the case where the metal sheets are loaded and shipped on edge, may be additionally braced at the opposite lower ends thereof by means of suitable brace members F, or in the manner illustrated in my copending application Serial No. 118,061, filed June 23, 1926.

It will be seen from the foregoing that any longitudinal movements of the pack as a result of collisions or shocks to which the car is subjected will be resisted by the longitudinal lower edges of the sheets biting into the bottom wooden sills 10, and will be cushioned by the wooden brace members F positioned against the lower opposite ends of the sheets, so that the end edges of the sheets will not become crimped. Any tendency of the pack of sheets to rock as a result of severe blows to the freight car will be resisted by the wooden bars or members 28 since it will be seen that the tendency of the pack to lift will be prevented by the central clamping device which is cushioned at the edges of the sheets by means of the members 28.

When the freight car carrying its four loads, such as ten ton stacks or packs of sheet metal, reaches its destination the stack lifter U is transferred by means of the electric lift truck T directly into the freight car through the doorway E as shown in Fig. 1. This lifter is deposited by the truck at the end of a first bundle to be unloaded, and thereupon the stack lifter is pushed into position to straddle the bundle as shown in Fig. 2. The construction of the stack lifter U and the manner in which it may be picked up on the lift platform of the truck is fully shown and described in my copending application Serial No. 133,374 filed September 3, 1926, and a description of this mechanism is not deemed necessary in this application. It will be understood that the end bracing F is first removed from the ends of the bundles prior to moving the stack lifter U into position to straddle the bundle.

It will be understood that the stack lifter is provided with electrically driven hoisting mechanism within the upper or top structure thereof, the power being taken from the battery of the truck T by conductors 51. The lifting operation is accomplished by means of four hoisting drums adjacent to the four corners of the lifter, and these drums operate four hoisting cables having sheaves and hooks H at the lower ends thereof. The four sheave hooks are hooked into the eye loops 18 of the bracing apparatus B, and by operating the hoisting mechanism the bundle is elevated a suitable distance above the car floor as shown in Fig. 2.

As soon as the bundle is elevated a series of conveyor means is disposed on the floor, the same being provided with anti-friction surfaces such as gravity rolls G; these rolls are laid in alinement on the car floor so as to extend from a point beneath the bundle (see Fig. 2) toward the car doorway. Although I refer to the conveyor means as gravity rolls throughout the specification and claims, it will be understood that this term is used in a generic sense to cover any suitable conveyor relative to and over which the pack may be moved readily. As illustrated in Fig. 6, the sections of gravity roll may be connected at the car doorway with other sections laid on the loading dock.

Adapted to travel on the conveyor or gravity rolls is a portable platform P. This platform is provided with spaced pairs of legs Q at opposite sides thereof, and each adjacent pair of legs are connected at the bottom thereof by means of a longitudinal skid or runner R. The conveyor tracks G are readily laid preferably in short sections, such as eight foot sections, and may be temporarily held on the car floor by means of several nails or spikes. In the present invention I prefer to use sections of gravity rolls, each section comprising a pair of angles 30 and 31 positioned so as to provide a channel between the opposite vertical flanges thereof. Journalled between these vertical flanges are a series of closly spacd rollers 32. The runners R of the platform P travel or roll readily over the rollers and are guided by means of projecting guides 31ª extending from the vertical flanges of the inner angles 31.

After the sections of conveyor rolls have been laid in the car, the platform P is run into the car on these rolls beneath the bundle while suspended above the car floor by the stack lifter U, and thereupon the stack S is lowered onto the platform P. The platform carrying the stack or bundle may then be rolled on the gravity rolls to the car doorway, and where the floor of the car is at the same level as the loading dock D the conveyor rolls may extend out of the car doorway along the dock. In this instance as shown in Fig. 6 the platform with its bundle will be rolled out from beneath the stack lifter U through the doorway of the car and over the dock any suitable distance.

Referring to Figs. 7 and 8 the conveyor sections are shown terminating at any predetermined point, and the platform with its load may be shifted directly onto the lift platform L of an electrically driven lift truck T.

The lift truck T is preferably of five or ten ton capacity, and the construction thereof is shown and described in my co-pending application Serial No. 118,584, filed June 25, 1926. The portable platform P is also preferably of ten ton capacity and constructed in the manner shown and described in my co-pending application Serial No. 120,303, filed July 3, 1926.

It will be understood that the lift truck as shown in the above application is provided beneath the load elevating platform L with four pairs of load supporting wheels having a relatively wide bearing surface. The distance between the spaced sections of conveyor or gravity rolls G is greater than the distance between the two pairs of load supporting wheels W of the truck thereby permitting the truck to be propelled the length of the platform L between the conveyor sections. In this manner the portable platform P with its load may be moved over the conveyor rolls directly onto the load elevating platform L of the truck, as shown in Figs. 7 and 8. Thereupon this lift platform L is raised or elevated by power mechanism so as to lift the portable platform P with the stack S vertically above the conveyor rolls so as to clear the same. The truck may then be backed away from the conveyor sections and propelled to a point where the stack may be lifted off the platform by means of a crane and stored.

In accordance with the present method the pack or stack S may be lifted or removed from the platform P either at the doorway of the car, by means of an overhead crane as shown in Figure 9, or may be lifted from the truck platform at any other point by means of an overhead crane, depending upon the arrangement of the storage facilities of the particular plant. Thus where the packs of sheets or material are piled in storage until ready for use at a point near the point where the freight car is unloading, the stack S may be lifted from the platform P at the doorway of the car by means of an overhead crane and thence carried and deposited at the storage point, which is usually near the machines or presses. Where the storage point and machines are at too great a distance from the freight car to render it practical to use the overhead crane in the foregoing manner, the stack is transferred from the gravity rolls either at the car doorway or at some point on the loading dock, to a lift truck T and thence propelled into the storage place of the plant near the machines. From this storage or delivery point, where usually a large number of packs or stacks of sheets are stored, each pack is transferred to the machine by means of an overhead crane.

Figure 3:
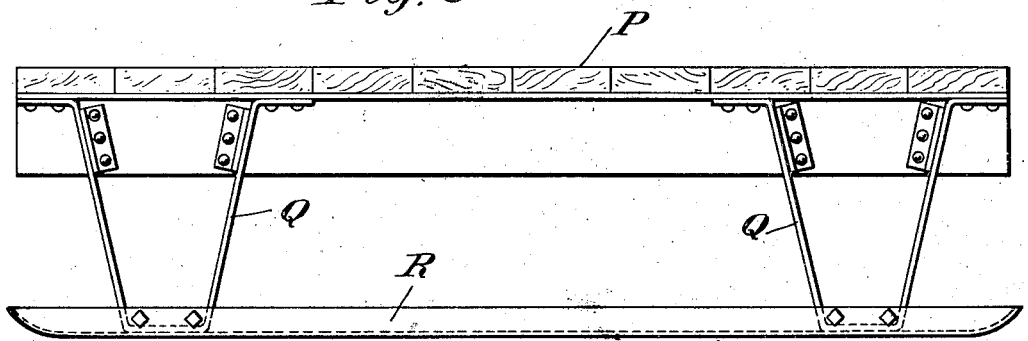
Fig. 3 is a side elevation showing a platform which may be used for supporting and carrying the pack into or out of the car.
Figure 4:
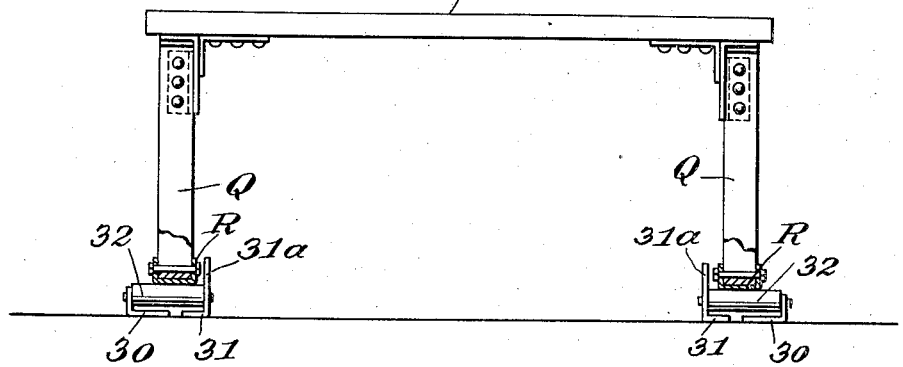
Fig. 4 is an end elevation partly in section showing the platform mounted on the gravity rolls.
Figure 5:
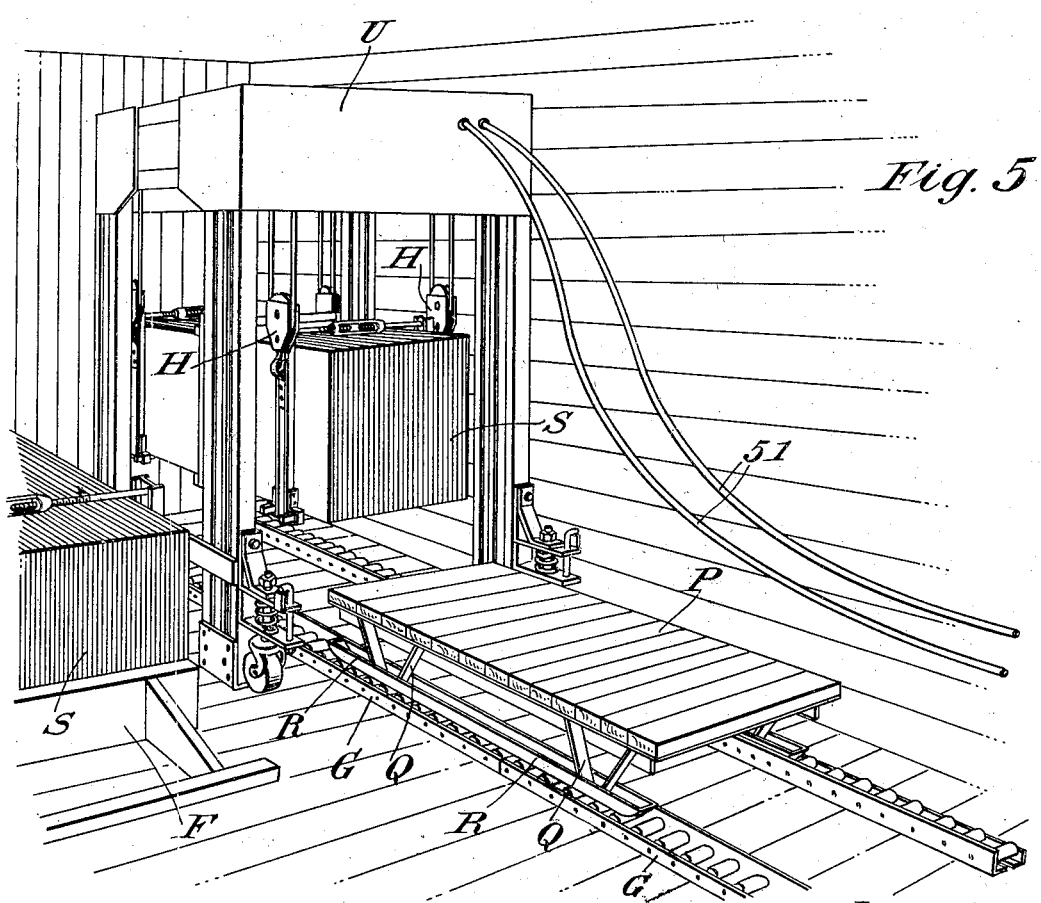
Fig. 5 is a perspective view similar to Fig. 2 showing the platform on the gravity rolls being moved out from beneath the bundle, or being moved into position beneath the bundle while raised.

The loading of the freight car is preferably accomplished in accordance with this invention in the reverse order of steps to the manner of unloading the car, as above described. The lift truck T may deliver the platform with the stack thereon to the gravity rolls as shown in Figs. 7 and 8. The stack is preferably first braced or clamped by means of the bracing apparatus B. The platform may be rolled on the conveyor directly through the car doorway to the end of the car between the legs of the stack lifter U. The bundle S is then raised so as to clear the platform, and the latter moved out rearwardly from beneath the stack lifter, see Fig. 3. Thereupon the conveyor sections G are removed from beneath the stack and the stack lowered onto the car floor. The remaining three stacks are successively loaded in the car in the same manner, the sections of conveyor rolls being laid each time in proper position and the stack lifter wheeled into position to straddle the stack.

What I claim as my invention is—

1. The hereindescribed method of unloading heavy bundles or packs, such as metal, from a freight car, consisting in bodily lifting the bundle above the car floor, laying conveyor rolls on the car floor to extend from the car doorway to a point beneath the bundle while raised, lowering the bundle onto a platform resting on said rolls, propelling the platform to the car doorway on said rolls, and lifting the bundle as a unit from said platform.

2. The hereindescribed method of unloading heavy bundles or packs, such as metal, from a freight car, consisting in bodily lifting the bundle above the car floor, laying spaced sections of gravity rolls from the doorway of the car to a point beneath the bundle while raised, lowering the bundle onto a platform supported on said rolls, and moving the platform to the doorway on said rolls.

3. The hereindescribed method of unloading heavy bundles or packs, such as metal, from a freight car, consisting in lifting the bundle above the car floor by means arranged thereabove and supported on the car floor at opposite sides of the bundle, laying a conveyor to extend from a point beneath the raised bundle and between the points of support of said lifting means toward the car doorway, lowering the bundle and supporting it on the conveyor, and moving the bundle as a unit on and relatively to the conveyor toward the car doorway.

4. The hereindescribed method of unloading heavy bundles or packs, such as metal, from a freight car, consisting in moving a lifting device into position to straddle the bundle, lifting the bundle above the car floor by means of said device, laying conveyor rolls on the car floor to extend from the car doorway to a point beneath the bundle while raised, lowering the bundle onto a platform resting on said rolls, and propelling the platform to the car doorway on and relatively to said rolls.

5. The hereindescribed method of unloading heavy bundles or packs, such as sheet or strip metal, from a freight car, consisting in bodily lifting the bundle above the car floor, laying conveyor rolls on the car floor to extend from adjacent the car doorway to a point beneath the bundle while raised, lowering the bundle onto said rolls, propelling the bundle over and relatively to the rolls to a point adjacent the car doorway, and lifting the bundle as a unit from the rolls.

6. The hereindescribed method of unloading heavy bundles or packs, such as sheet or strip metal, from a freight car, consisting in bodily lifting the bundle above the car floor by lifting means arranged thereabove and supported on the car floor at opposite sides of the pack, laying conveyor rolls on the car floor to extend from adjacent the car doorway to a point beneath the bundle while raised and between said lifting means supports, lowering the bundle onto said rolls, propelling the bundle over and relatively to the rolls to a point adjacent the car doorway, and lifting the bundle as a unit from the rolls.

7. The hereindescribed method of loading heavy bundles or packs, such as sheet or strip metal, upon a freight car which consists in laying conveyor rolls on the car floor to extend from adjacent the car doorway to the point at which the bundle is to be located, conveying the bundle to said conveyor rolls and depositing the same thereon, propelling the bundle over and relatively to the rolls to said point, lifting the bundle as a unit from the rolls, removing the rolls from beneath the bundle while the latter is raised and thereafter depositing the bundle upon the freight car floor.

In testimony whereof I affix my signature.

ROBERT T. ROMINE.